3,372,032
PREPARATION OF A DRY MIXTURE OF STARCH HYDROLYSATE AND VEGETABLE MEAL
Marcel L. E. van Tittelboom, Sas Van Gent, Netherlands, assignor to Corn Products Company, New York, N.Y., a corporation of Delaware
No Drawing. Filed Dec. 30, 1964, Ser. No. 422,419
Claims priority, application Netherlands, Jan. 10, 1964, 64—146
4 Claims. (Cl. 99—2)

This invention relates to a new composition of matter comprising vegetable protein meal and starch hydrolysates and to a method of making such composition.

It is known that vegetable protein meals, e.g., corn (maize) gluten meal, in combination with carbohydrates, such as molasses, are useful in animal feeding. For example, it is known to mix about 25 percent of molasses with certain feed products, but when corn gluten meal is mixed with such an amount of molasses, the resultant mixture is sticky and may set up into a hard cake which obviously is difficult to handle. Moreover, there is a need for certain feedstuffs which contain a much higher amount of carbohydrate than 25 percent. For example, it has been found that as much as about 50 percent of soluble carbohydrates combined with about 50 percent of gluten meal improves animal feeds in certain respects. Crystalline sugars such as sucrose and dextrose are eminently satisfactory but too expensive for this purpose.

Starch hydrolysate liquors, e.g., mother liquors from the manufacture of crystalline dextrose, are particularly useful as soluble carbohydrates in feedstuffs, but heretofore no satisfactory method of mixing such carbohydrates with gluten meal in the desired amount has been found.

I have now discovered that about 50 to about 60 percent, dry basis, of starch hydrolysate liquors, may be mixed with vegetable protein meal to form a dry, powdered product.

In carrying out my invention, it is necessary to intimately mix or evenly distribute the starch hydrolysate liquor, e.g., mother liquor from the manufacture of crystalline dextrose, throughout the protein meal, e.g., corn (maize) gluten meal. In order to accomplish this, for example, the liquor, in finely divided form, may be sprayed onto the gluten meal while it is being mixed or agitated slowly. After all of the liquor has been added to the gluten meal, the resultant mixture, which is a sticky mass, is agitated slowly until crystallization of the dextrose has been completed. Inasmuch as heat is generated by crystallization of the dextrose, cooling means should be provided to keep the product at a temperature favorable to crystallization. One method of accomplishing this is to cool the top layer of the mass in movement in the mixer by means of air.

The temperature of the starch hydrolysate liquor used should be high enough to prevent crystallization of dextrose therein and to permit it to be sprayed onto, or mixed easily with, the gluten meal. The temperature of the mixture of starch hydrolysate liquor and gluten meal should be within the range of about 30 to 50° C. to permit crystallization of the dextrose therein. A practical operating and preferred range is 38 to 40° C. When the temperature of the starch hydrolysate liquor is about 70 to 80° C. and that of the gluten meal is room temperature, the temperature of the resultant mixture is generally within the preferred range.

The moisture content of the mixture of gluten meal and starch hydrolysate liquor must be adjusted so that not more than 13 percent is present in order that the dry product may be formed. A practical operating moisture content of gluten meal is about 9 percent and of the starch hydrolysate liquor about 17 percen t(about 43.5° Bé.) When the greater amount of starch hydrolysate liquor specified is used, if may be necessary to dry the gluten meal to a lower moisture content than 9 percent.

In addition to corn (maize) gluten meal, one may use sorghum meal or other vegetable protein meals such as commercial deoiled soya meal or deoiled peanut meal containing not more than about 10 percent oil.

Any starch hydrolysate liquor having a D. E. value of at least about 75 percent, for example, 79 to 84 percent, and containing at least 50 percent of dextrose may be used for purposes of the present invention. Particularly useful are the mother liquors, with or without reconversion, obtained from various stages in the manufacture of crystalline dextrose. The solids content of the liquor to be used will vary with the amount of dextrose in the liquor and must be sufficient to permit crystallization of dextrose to take place therein at the prescribed temperature range.

The time required for the crystallization to take place may vary widely but generally falls within the range of 18 to 24 hours, depending upon the quality of the liquor used.

The ratio of vegetable protein meal to starch hydrolysate liquor may vary from about 40 to 50 percent (meal) to about 60 to 50 percent (liquid), all on a dry substance basis, the preferred ratio being 45 to 50 percent (meal) to about 55 to 50 percent (liquor).

One of the surprising features of my invention is the fact that as much as 50 to 60 percent of a starch hydrolysate liquor can be mixed with vegetable protein meal to form a dry, powdered product. One would not expect the sticky mass first obtained to change into a dry powder. On the contrary, one would expect it to remain a sticky mass because of the great amount of non-dextrose materials present to prevent crystallization of the dextose. The product has the same general characteristics as to form and flow as the protein meal used as starting material, hence requires no grinding.

In a particular embodiment of my invention, 4,500 kg. of corn gluten meal having a moisture content of 9 percent was placed in a vertical conveyor mixer (10,000 liters volume) operating at 60 r.p.m. A pipe with a spray nozzle was attached to the bottom part of the mobile arm (operating at 1.33 r.p.m.) in order to introduce the starch hydrolysate liquor under pressure and spray the same onto the gluten meal. Five thousand kilograms of mother liquor from the manufacture of crystallization of dextrose which had been reconverted to a D. E. value of 83 to 84 percent and having a density of 43.5 Bé. (83 percent dry substance) was sprayed onto the gluten meal while the same was slowly agitated. The temperature of the liquor was 80° C.

The spraying was done in two stages, although this is not necessary. In the first stage 3,250 kg. of the liquor was sprayed onto the gluten meal while it was agitated during a period of 1.5 hours. Thereafter, the resultant mixture was agitated for 0.5 hour. Then 1,250 kg. of liquor was sprayed onto the mixture during a period of 1 hour. At the end of this period, the mixture was a sticky mass. Agitation of the mixture was continued for 19 hours, the temperature of the mixture being maintained at 38–40° C., cool air being introduced as required at the top of the mixer so that the top layer of the mixture was exposed to the cool air. At the end of this period, the sticky mass had changed into a dry powdery mass which was cooled, screened, and packed The moisture content of the product was about 13 percent, hence no drying was required. The tailings from the screening operation can be ground and recycled, e.g., mixed with the crystallized product at the outlet of the mixer.

The above method was repeated but all of the starch hydrolysate liquor was added in one stage, over a period of 3.5 hours. Equally satisfactory results were obtained.

When the last mentioned method is repeated using a liquor having a D. E. value of about 78 percent substantially the same results are obtained. Similarly when deoiled soya bean meal and deoiled peanut meal containing not more than 10 percent oil are used with either of the aforementioned starch hydrolysate liquors, similar results are obtained.

Various mixing devices may be used as long as the liquor is distributed evenly on and throughout the gluten meal and means are provided for continuously and slowly agitating the mixture.

I claim:

1. A process for preparing a dry, powdered product suitable for feeding animals which comprises intimately mixing about 50 to 60 percent, dry basis, of a starch hydrolysate liquor with vegetable protein meal to form a sticky mass having a moisture content not in excess of 13 percent, maintaining the temperature of said mixture at about 30 to 50° C. while slowly agitating the mixture until a dry, powdered product is obtained; said starch hydrolysate liquor having a D. E. value of at least 75 percent and a dextrose content of at least 50 percent and a solids content sufficient to permit crystallization of the dextrose therein at said temperature; said vegetable protein meal containing not more than 10 percent of oil.

2. A process according to claim 1 wherein the amount of starch hydrolysate liquor is about 50 to 55 percent, dry basis, and the temperature of said mixture is maintained at 38 to 40° C.

3. A process according to claim 2 wherein said starch hydrolysate liquor has a temperature of 60 to 80° C. and is sprayed onto said vegetable protein meal at room temperature.

4. A process according to claim 3 wherein the vegetable protein meal is corn gluten meal having a moisture content of about 9 percent and the starch hydrolysate liquor has a D. E. value of 79 to 84 percent and a density of 43.5° Bé.

References Cited

UNITED STATES PATENTS

| | | | |
|---|---|---|---|
| 1,089,630 | 3/1914 | Eldridge | 99—6 |
| 1,135,417 | 4/1915 | Weaver | 99—6 |
| 2,427,520 | 9/1947 | Briod | 99—6 |

A. LOUIS MONACELL, *Primary Examiner.*

J. M. HUNTER, *Assistant Examiner.*